US009160019B2

(12) United States Patent
Liu et al.

(10) Patent No.: US 9,160,019 B2
(45) Date of Patent: Oct. 13, 2015

(54) MEMBRANE ELECTRODE ASSEMBLY AND METHOD FOR MAKING THE SAME

(71) Applicants: Tsinghua University, Beijing (CN); HON HAI PRECISION INDUSTRY CO., LTD., New Taipei (TW)

(72) Inventors: Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 212 days.

(21) Appl. No.: 13/859,713

(22) Filed: Apr. 9, 2013

(65) Prior Publication Data
US 2013/0224626 A1 Aug. 29, 2013

Related U.S. Application Data

(62) Division of application No. 12/006,309, filed on Dec. 29, 2007, now abandoned.

(51) Int. Cl.
*H01M 8/10* (2006.01)
*H01M 8/02* (2006.01)

(52) U.S. Cl.
CPC .............. *H01M 8/10* (2013.01); *H01M 8/0234* (2013.01); *H01M 8/1004* (2013.01); *H01M 2008/1095* (2013.01); *Y02E 60/521* (2013.01)

(58) Field of Classification Search
None
See application file for complete search history.

*Primary Examiner* — Gregg Cantelmo
(74) *Attorney, Agent, or Firm* — Novak Druce Connolly Bove + Quigg LLP

(57) ABSTRACT

A method for making membrane electrode assembly includes providing a proton exchange membrane and two electrodes. An array of carbon nanotubes is formed on a substrate. The array of carbon nanotubes is pressed by a pressing device to form a carbon nanotube film. A catalyst layer is formed on the carbon nanotube film to obtain an electrode. Two electrodes are disposed on two opposite surfaces of a proton exchange membrane, to obtain the membrane electrode assembly.

19 Claims, 6 Drawing Sheets

Fabricating a carbon nanotube film to act as a gas diffusion layer

Forming a catalyst layer on the carbon nanotube film to obtain an electrode; and Providing a proton exchange membrane, and disposing two of the electrode on opposite surfaces of the proton exchange membrane respectively, thereby forming the membrane electrode assembly

FIG. 2

MEMBRANE ELECTRODE ASSEMBLY AND METHOD FOR MAKING THE SAME

This application is a divisional of abandoned U.S. patent application Ser. No. 12/006,309, filed on Dec. 29, 2007 entitled, "MEMBRANE ELECTRODE ASSEMBLY AND METHOD FOR MAKING THE SAME". The disclosures of the above-identified applications are incorporated herein by reference.

BACKGROUND

1. Field of the Invention

The invention generally relates to membrane electrode assembly and method for making the same and, particularly, to a carbon nanotube based membrane electrode assembly of a fuel cell and method for making the same.

2. Discussion of Related Art

Fuel cells can generally be classified into alkaline, solid oxide, and proton exchange membrane fuel cells. The proton exchange membrane fuel cell has received more attention and has developed rapidly in recent years. Typically, the proton exchange membrane fuel cell includes a number of separated fuel cell work units. Each work unit includes a fuel cell membrane electrode assembly (MEA), flow field plates (FFP), current collector plates (CCP), as well as related support equipment, such as blowers, valves, and pipelines.

The MEA generally includes a proton exchange membrane and two electrodes separately disposed on two opposite surfaces of the proton exchange membrane. Further, each electrode includes a catalyst layer and a gas diffusion layer. The catalyst layer is configured for being sandwiched between the gas diffusion layer and the proton exchange membrane. The material of the proton exchange membrane is selected from the group consisting of perfluorosulfonic acid, polystyrene sulfonic acid, polystyrene trifluoroacetic acid, phenol formaldehyde resin acid, and hydrocarbons. The catalyst layer includes catalyst materials and carriers. The catalyst materials are selected from the group consisting of metal particles, such as platinum particles, gold particles, or ruthenium particles. The carriers are generally carbon particles, such as graphite, carbon black, carbon fiber or carbon nanotubes. The gas diffusion layer is constituted of treated carbon cloth and carbon paper.

The gas diffusion layer of MEA is mainly formed by a carbon fiber paper. A process of making the carbon fiber paper is by the steps of: mixing carbon fibers, wood pulp, and cellulose fibers; using the mixture to obtain a paper pulp; and then forming the carbon fiber paper from the paper pulp. However, the process of making the carbon fiber paper has the following disadvantages: Firstly, the carbon fibers in the carbon fiber paper are not uniformly dispersed, thereby the gaps therein are uneven resulting in the carbon fibers having a small specific surface area. Thus, the structure restricts the gas diffusion layer to uniformly diffuse the gases, which is needed for the MEA. Secondly, the carbon fiber paper has high electrical resistance, thus restricting the transfer of electrons between the gas diffusion layer and the external electrical circuit, thereby reducing the reaction activity of the MEA. Thirdly, the carbon fiber paper has poor tensile strength, and is difficult to process.

What is needed, therefore, is a membrane electrode assembly having excellent reaction activity and method for making the same being simple and easy to be applied.

BRIEF DESCRIPTION OF THE DRAWINGS

Many aspects of the present membrane electrode assembly and the method for making the same can be better understood with reference to the following drawings. The components in the drawings are not necessarily to scale, the emphasis instead being placed upon clearly illustrating the principles of the present membrane electrode assembly and the method for making the same.

FIG. 2 is a flow chart of a method for making the membrane electrode assembly shown in FIG. 1.

Figure 1:
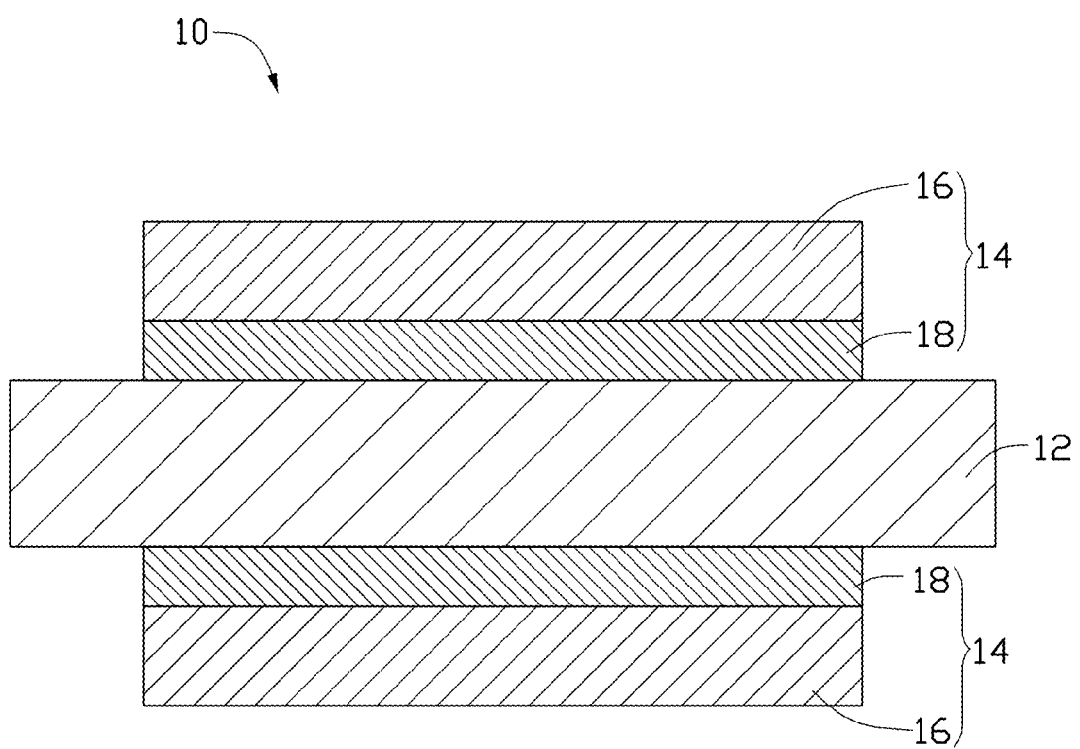
FIG. 1 is a schematic view of a membrane electrode assembly, in accordance with the present embodiment.

Corresponding reference characters indicate corresponding parts throughout the several views. The exemplifications set out herein illustrate at least one present embodiment of the membrane electrode assembly and the method for making the same, in at least one form, and such exemplifications are not to be construed as limiting the scope of the invention in any manner.

DETAILED DESCRIPTION OF PREFERRED EMBODIMENTS

Reference will now be made to the drawings, in detail, to describe embodiments of the membrane electrode assembly and the method for making the same.

Referring to FIG. 1, a membrane electrode assembly 10 is provided in the present embodiment. The membrane electrode assembly 10 includes a proton exchange membrane 12 and two electrodes 14. The proton exchange membrane 12 includes two opposite surfaces. The two electrodes 14 are separately disposed on the two opposite surfaces of the proton exchange membrane 12. Further, each of the electrodes 14 includes a catalyst layer 18 and a gas diffusion layer 16. The catalyst layer 18 is configured for being sandwiched between the gas diffusion layer 16 and the proton exchange membrane 12.

The gas diffusion layer 16 includes a carbon nanotube film. The carbon nanotube film includes a plurality of carbon nanotubes nearly parallel to a surface of the carbon nanotube film. The carbon nanotubes are selected from the group consisting of the carbon nanotubes isotropically arranged, arranged along a fixed direction, or arranged along different directions. The adjacent carbon nanotubes are combined and attracted by van der Waals attractive force, thereby forming a free-standing structure. Due to the carbon nanotube film having a plurality of carbon nanotubes isotropically arranged, arranged along a fixed direction, or arranged along different directions, the carbon nanotube film has good tensile strength, thereby having a free-standing structure. It is understood that the carbon nanotube film is very microporous. Sizes of the micropores are less than 1 micrometer. Length and width of the carbon nanotube film is not limited. It can be made with any desired length or width according to practical needs. In the present embodiment, a thickness of the carbon nanotube film is in an approximate range from 1 micrometer to 1 millimeter.

The catalyst materials includes metal particles and carbon particles. The metal particles are selected from the group consisting of platinum particles, gold particles, and ruthenium particles. The carbon particles are selected from the group consisting of graphite, carbon black, carbon fiber, and carbon nanotubes. Quite suitably, the metal particles are platinum; and the carbon particles are carbon nanotubes. The metal particles are dispersed in the carbon particles, thereby forming the catalyst layer 18. The loading of the metal particles is less than 0.5 mg/cm$^2$ (milligram per square centimeter). The material of the proton exchange membrane 12 is selected from the group consisting of perfluorosulfonic acid, polystyrene sulfonic acid, polystyrene trifluoroacetic acid, phenol-formaldehyde resin acid, and hydrocarbons.

Referring to FIG. 2, a method for making the above-described membrane electrode assembly 10 are provided in the present embodiment. The method includes the steps of: (a) fabricating a carbon nanotube film to act as a gas diffusion layer; (b) forming a catalyst layer on the carbon nanotube film to obtain an electrode; and (c) providing a proton exchange membrane, and disposing two of the electrode on opposite surfaces of the proton exchange membrane respectively, thereby forming the membrane electrode assembly.

The carbon nanotube film is formed by the substeps of: (a1) providing an array of carbon nanotubes formed on a substrate; and (a2) providing a pressing device to press the array of carbon nanotubes, thereby forming a carbon nanotube film.

In step (a1), an array of carbon nanotubes, quite suitably, a super-aligned array of carbon nanotubes is provided. The given super-aligned array of carbon nanotubes can be formed by the steps of: (a11) providing a substantially flat and smooth substrate; (a12) forming a catalyst layer on the substrate; (a13) annealing the substrate with the catalyst layer in air at a temperature in the approximate range from 700° C. to 900° C. for about 30 to 90 minutes; (a14) heating the substrate with the catalyst layer to a temperature in the approximate range from 500° C. to 740° C. in a furnace with a protective gas therein; and (a15) supplying a carbon source gas to the furnace for about 5 to 30 minutes and growing a super-aligned array of carbon nanotubes on the substrate.

In step (a11), the substrate can, beneficially, be a P-type silicon wafer, an N-type silicon wafer, or a silicon wafer with a film of silicon dioxide thereon. Preferably, a 4-inch P-type silicon wafer is used as the substrate.

In step (a12), the catalyst can, advantageously, be made of iron (Fe), cobalt (Co), nickel (Ni), or any alloy thereof.

In step (a14), the protective gas can, beneficially, be made up of at least one of nitrogen ($N_2$), ammonia ($NH_3$), and a noble gas. In step (a15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height more than 100 micrometers and include a plurality of carbon nanotubes parallel to each other and approximately perpendicular to the substrate. Because the length of the carbon nanotubes is very long, portions of the carbon nanotubes are bundled together. Moreover, the super-aligned array of carbon nanotubes formed under the above conditions is essentially free of impurities such as carbonaceous or residual catalyst particles. The carbon nanotubes in the super-aligned array are closely packed together by the van der Waals attractive force.

Figure 3:
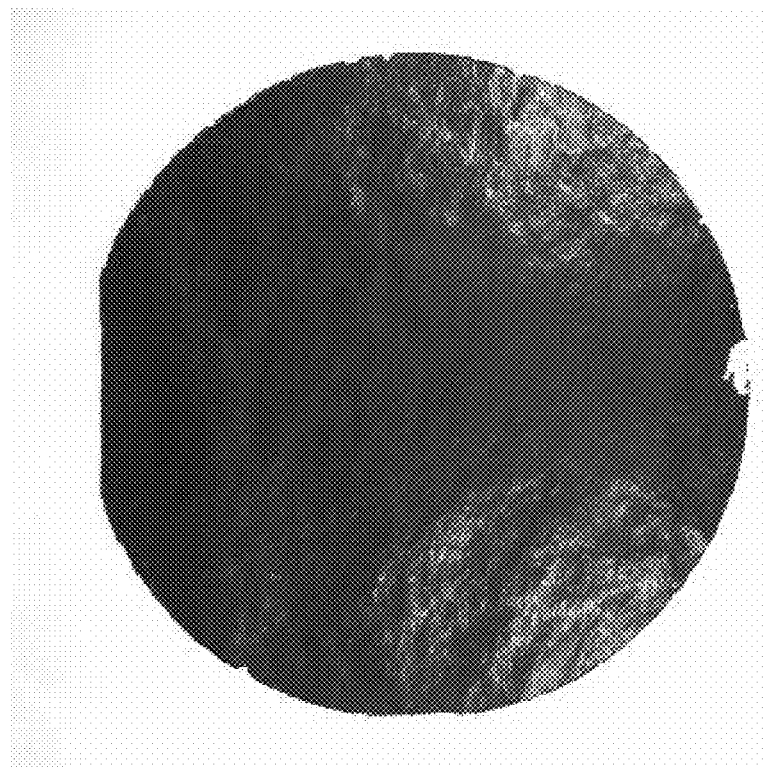
FIG. 3 shows a Scanning Electron Microscope (SEM) image of a carbon nanotube film formed by the method of FIG. 2.

In step (a2), a certain pressure can, beneficially, be applied to the array of carbon nanotubes by the pressing device. In the process of pressing, the carbon nanotubes in the array of carbon nanotubes form the carbon nanotube film under pressure. Quite suitably, the carbon nanotubes are nearly all parallel to a surface of the carbon nanotube film. Referring to FIG. 3, a macrostructure photograph of the carbon nanotube film produced in the present embodiment is provided. The carbon nanotube film is circular with a diameter of about 10 centimeters.

Figure 4:
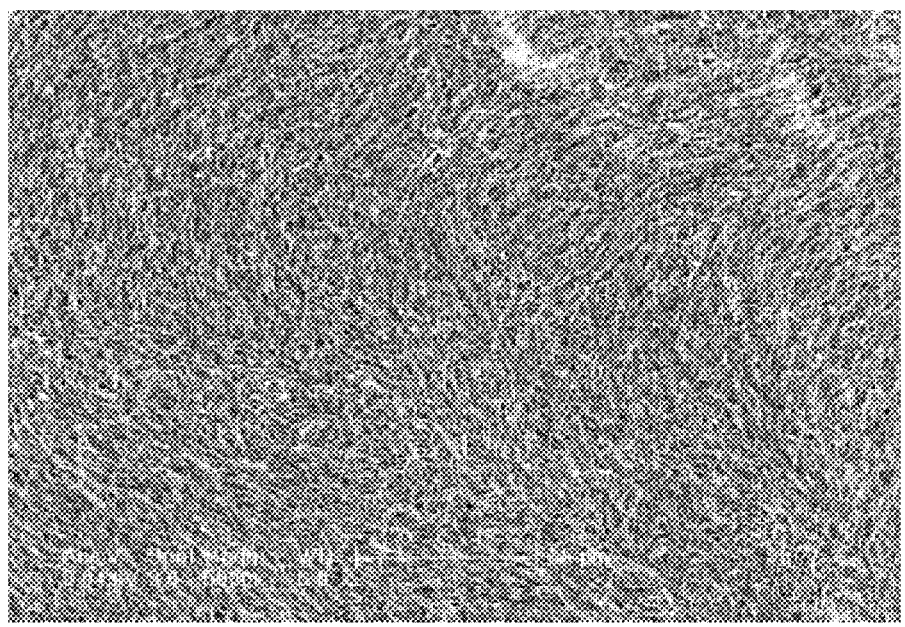
FIG. 4 shows a Scanning Electron Microscope (SEM) image of a carbon nanotube film including isotropic carbon nanotubes formed by the method of FIG. 2.
Figure 5:
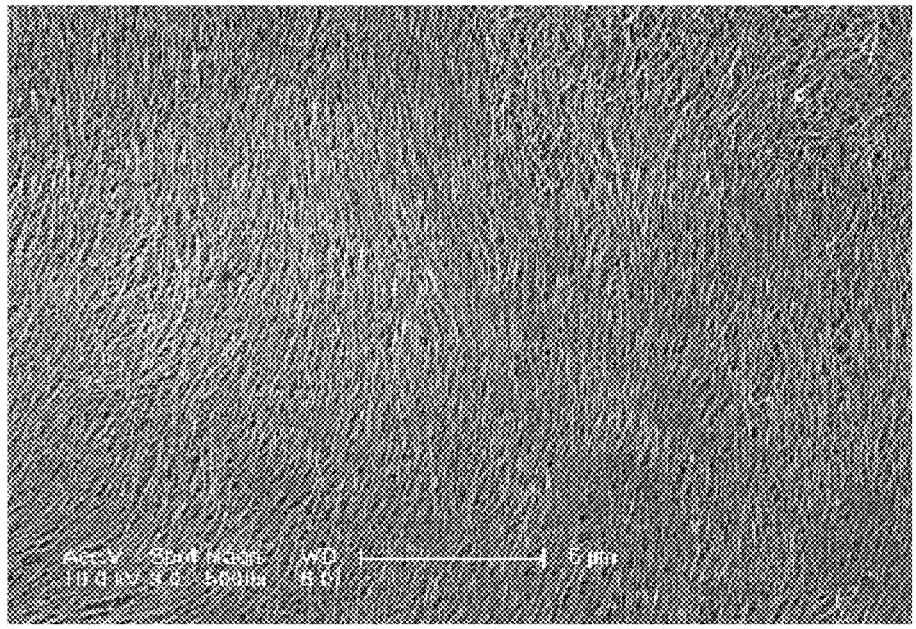
FIG. 5 shows a Scanning Electron Microscope (SEM) image of a carbon nanotube film formed by the method of FIG. 2 wherein the carbon nanotubes in the film have a preferred orientation.

In the present embodiment, the pressing device can, advantageously, be a pressure head. The pressure head has a glossy surface. It is to be understood that, the shape of the pressure head and the pressing direction can, opportunely, determine the direction of the carbon nanotubes arranged therein. Specifically, referring to FIG. 4, when a planar pressure head is used to press the array of carbon nanotubes along the direction perpendicular to the substrate, a carbon nanotube film having a plurality of carbon nanotubes isotropically arranged can, advantageously, be obtained. Referring to FIG. 5, when a roller-shaped pressure head is used to press the array of carbon nanotubes along a fixed direction, a carbon nanotube film having a plurality of carbon nanotubes aligned along the fixed direction is obtained. When a roller-shaped pressure head is used to press the array of carbon nanotubes along different directions, a carbon nanotube film having a plurality of carbon nanotubes aligned along different directions is obtained.

Understandably, in the process of pressing, the carbon nanotubes will, beneficially, slant, thereby forming a carbon nanotube film having a free-standing structure. The carbon nanotubes in the free-standing structure are nearly all parallel to a surface of the carbon nanotube film, and are isotropically arranged, arranged along a fixed direction, or arranged along different directions.

It is to be understood that, a degree of the slant of the carbon nanotubes in the carbon nanotube film is related to the pressure. The greater the pressure, the greater the degree of slant. A thickness of the carbon nanotube film is opportunely determined by the height of the carbon nanotube array and the pressure. That is, the higher the height of the carbon nanotube array and the less the pressure, the larger the thickness of the carbon nanotube film.

Understandably, in the present embodiment, the carbon nanotube film is obtained by pressing a pressing device on an array of carbon nanotubes. Due to the array of carbon nanotubes having a plurality of carbon nanotubes uniformly dispersed, the carbon nanotube film includes a plurality of carbon nanotubes uniformly dispersed, and has good mechanical strength and tensile strength, thereby easy to process. Thus, the carbon nanotube film can, opportunely be cut into most any desired shape. It can advantageously be applied to use in the fuel cell, especially, the micro-type fuel cell as a gas diffusion layer.

In step (b), the catalyst layer 18 is formed by the substeps of: (b1) putting metal particles and carbon particles into a dispersion solution; (b2) adding water and a surface active agent to the dispersion solution to obtain a catalyst slurry; (b3) coating the catalyst slurry on the carbon nanotube film and drying the catalyst slurry, thereby forming the catalyst layer on the carbon nanotube film to obtain the electrode.

In step (b1), the metal particles are selected from the group consisting of platinum, gold and ruthenium. The carbon particles are selected from the group consisting of graphite, carbon black, carbon fibers, and carbon nanotubes. The metal particles load on surfaces of the carbon particles. Further, loading of the metal particles is less than 0.5 mg/cm$^2$. The carbon particles have the properties of high conductivity, a high specific surface area, and good corrosion resistance. In order to enhance the dispersion of carbon particles in the dispersion solution, a ball mill refiner is used to mill the carbon particles. CHF 1000 resin is dissolved in dimethyl acetamide to form the dispersion solution. A mass percent of the CHF 1000 resin in the dispersion solution is about 5%.

In step (b2), the surface active agent is used to restrain agglomeration of the carbon particles. Thus, in the present embodiment, isopropanol is used as the surface active agent. After the water and the surface active agent are added into the dispersion solution, a process of dispersing the dispersion solution is executed by an ultrasonic dispersing or an agitating.

In step (b3), a process of coating is executed by a spraying method, an immersing method, or a screen printing method. The above-described methods can, opportunely, ensure that the catalyst slurry is uniformly and densely coated on the carbon nanotube film. In order to reduce the cracks and voids in the catalyst layer 18, the drying method is executed at a low temperature. The drying process is selected from the group consisting of an oven drying method and a sintering method.

In step (c), the two electrodes 14 are attached on the two opposite surfaces of the proton exchange membrane 12 via a heat pressing process. Further, the catalyst layer 18 is configured for being sandwiched between the gas diffusion layer 16 and the proton exchange membrane 12. The material of the proton exchange membrane 12 is selected from the group consisting of perfluorosulfonic acid, polystyrene sulfonic acid, polystyrene trifluoroacetic acid, phenol formaldehyde resin acid, and hydrocarbons.

Figure 6:
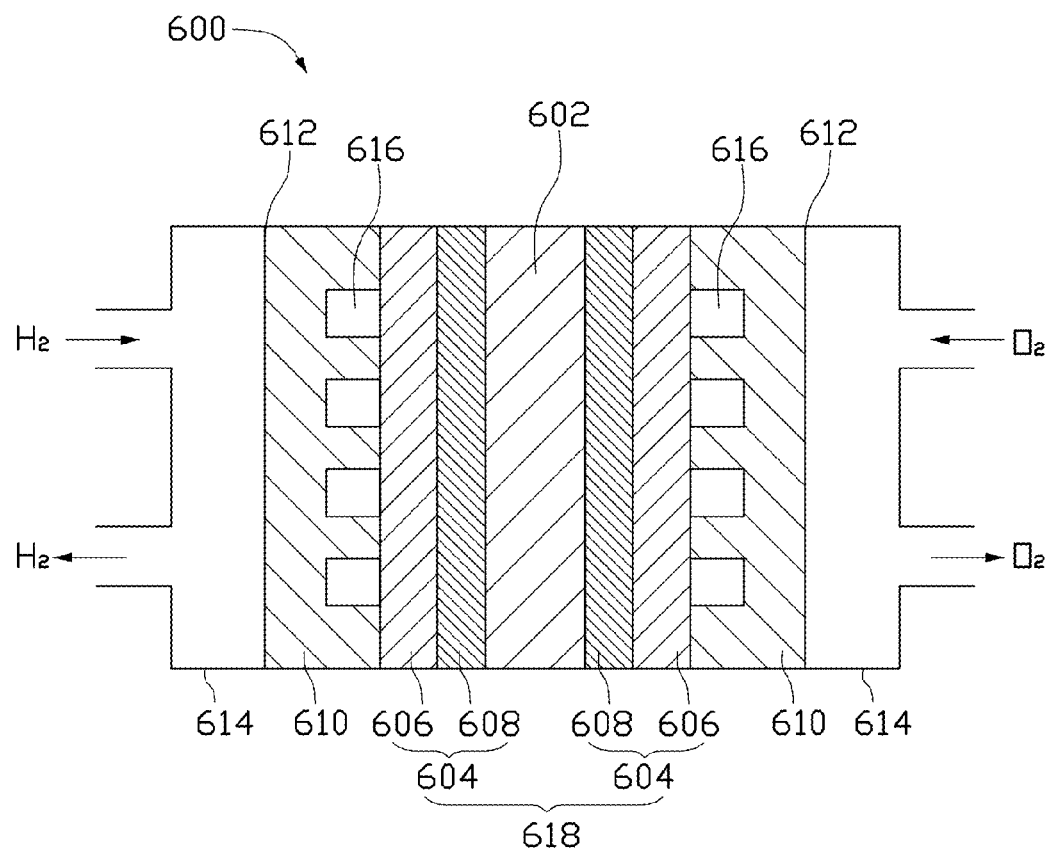
FIG. 6 is a schematic view of a fuel cell in accordance with the present embodiment.

Referring to FIG. 6, a fuel cell 600 is further provided in the present embodiment. The fuel cell 600 includes a membrane electrode assembly (MEA) 618, two flow field plates (FFP) 610, two current collector plates (CCP) 612, as well as related support equipment 614. The MEA 618 includes a proton exchange membrane 602 and two electrodes 604 separately disposed on two opposite surfaces of the proton exchange membrane 602. Further, each electrode includes a catalyst layer 608 and a gas diffusion layer 606. The catalyst layer 608 is configured for being sandwiched between the gas diffusion layer 606 and the proton exchange membrane 602. The material of the proton exchange membrane 602 is selected from the group consisting of perfluorosulfonic acid, polystyrene sulfonic acid, polystyrene trifluoroacetic acid, phenol-formaldehyde resin acid, and hydrocarbons. The proton exchange membrane 602 is used to conduct the protons generated in the MEA 618, and separate the fuel gases and the oxidant gases. The catalyst layer 608 includes catalyst materials and carriers. The catalyst materials are selected from the group consisting of metal particles, such as platinum particles, gold particles, or ruthenium particles. The carrier is generally carbon particles, such as graphite, carbon black, carbon fiber or carbon nanotubes. The gas diffusion layer 606 is the carbon nanotube film produced in the present embodiment. The FFP 610 is made of metals or conductive carbon materials. Each FFP 610 is disposed on a surface of each electrode 604 facing away from the proton exchange membrane 602. The FFP 610 has at least one flow field groove 616. The flow field groove 616 is contacted with the gas diffusion layer 606. Thus, the flow field groove 616 is used to transport the fuel gases, the oxidant gases, and the reaction product (i.e. water). The CCP 612 is made of conductive materials. Each CCP 612 is disposed on a surface of each FFP 610 facing away from the proton exchange membrane 602. Thus, the CCP 612 is used to collect and conduct the electrons in the work process of MEA 618. The related support equipment 614 include blowers, valves, and pipelines. The blower is connected with the flow field plate 610 by the pipelines. The fuel gases and the oxidant gases are blown by the blowers In work process of the fuel cell 600, fuel gases (i.e. hydrogen) and oxidant gases (i.e. pure oxygen or air containing oxygen) are respectively applied to a surface of each electrode through the flow field plates 610 by the related equipment 614. Specifically, hydrogen is applied to an anode; and oxygen to a cathode. In one side of the MEA 618, after the hydrogen is applied to the catalyst layer 608, a reaction of each hydrogen molecule is as follows: $H_2 \rightarrow 2H^+ + 2e$. The hydrogen ions generated by the above-described reaction reach the cathode through the proton exchange membrane 602. At the same time, the electrons generated by the reaction also arrive at the cathode by an external electrical circuit. In the other side of the MEA 618, oxygen is applied to the cathode. Thus, the oxygen reacts with the hydrogen ions and electrons as follows:

$$\frac{1}{2}O_2 + 2H^+ + 2e \rightarrow H_2O.$$

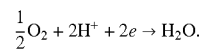

In the electrochemical reaction process, the electrons form an electrical current, thereby being able to output electrical energy. Accordingly, the water generated by the reaction penetrates the gas diffusion layer 606 and the flow field plate 610, thereby moving out of the MEA 608. From the above-described process, it is known that the gas diffusion layer 606 acts as a channel for the fuel gases, oxidant gases, as well as the electrons. Fuel gas and oxidant gases from the gas diffusion layer 606 arrive at the catalyst layer, and the electrons through the gas diffusion layer 606 are connected with the external electrical circuit.

In the present embodiment, the gas diffusion layer 606 includes the carbon nanotube film. The carbon nanotube film includes a plurality of carbon nanotubes isotropically arranged, arranged along a fixed direction, or arranged along different directions. Thus, the carbon nanotube film has the microporous structure and a large specific surface area. As such, in one side of MEA 618, the hydrogen can be effectively and uniformly diffused in the carbon nanotube film. The hydrogen fully contacts with metal particles in the catalyst layer 608. Thus, the catalytic reaction activity of the metal particles with the hydrogen is enhanced. In another side of the MEA 618, the oxidant gases are also uniformly diffused to the catalyst layer 608 through the carbon nanotube film, thereby fully contacting with the metal particles of the catalyst layer 608. Thus, the catalytic reaction activity of the metal particles with the hydrogen ions and electrons is enhanced. Due to the carbon nanotube film having good conductivity, the electrons needed or generated in the reactions are quickly conducted by the carbon nanotube film.

Moreover, a method for making the carbon nanotube film to be used as the gas diffusion layer 606 has the following virtues. Firstly, the carbon nanotube film is obtained by pressing a pressing device on an array of carbon nanotubes. Due to the array of carbon nanotubes having a plurality of carbon nanotubes uniformly dispersed, the carbon nanotube film includes a plurality of carbon nanotubes uniformly dispersed, and has good mechanical strength and tensile strength, thereby easy to process. Thus, the carbon nanotube film can, opportunely be cut into most any desired shape. It can advantageously be applied to use in the fuel cell, especially, the micro-type fuel cell as a gas diffusion layer. Secondly, by controlling the pressing process, the carbon nanotube film can, opportunely, be formed as a the free-standing structure, which includes a plurality of carbon nanotubes isotropically arranged, arranged along a fixed direction, or arranged along different directions. Thus, different properties of the gas diffusion layer 606 can, advantageously, be obtained.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a membrane electrode assembly, the method comprising the steps of:
   (a1) providing an array of carbon nanotubes formed on a substrate;
   (a2) providing a pressing device to press the array of carbon nanotubes, thereby forming a carbon nanotube film;
   (b) forming a catalyst layer on the carbon nanotube film to obtain a first electrode, and repeating steps (a1),(a2),(b) to obtain a second electrodes; and
   (c) providing a proton exchange membrane, and disposing the first electrode and the second electrode separately on two opposite surfaces of the proton exchange membrane, thereby forming the membrane electrode assembly.

2. The method as claimed in claim 1, wherein the array of carbon nanotubes is a super-aligned array of carbon nanotubes obtained by follow steps:
   (a11) providing the substrate;
   (a12) forming a carbon nanotube growth catalyst layer on the substrate;
   (a13) annealing the substrate with the catalyst layer in air at a temperature in a range from about 700° C. to about 900° C. for about 30 minutes to 90 minutes;
   (a14) heating the substrate with the carbon nanotube growth catalyst layer to a temperature in a range from about 500° C. to about 740° C. in a furnace with a protective gas therein; and
   (a15) supplying a carbon source gas to the furnace for about 5 minutes to 30 minutes and growing the super-aligned array of carbon nanotubes on the substrate.

3. The method as claimed in claim 2, where the super-aligned array of carbon nanotubes has a height more than 100 micrometers and comprises a plurality of carbon nanotubes parallel to each other and approximately perpendicular to the substrate.

4. The method as claimed in claim 3, wherein the plurality of carbon nanotubes in the super-aligned array of carbon nanotubes is closely packed together by the van der Waals attractive force.

5. The method as claimed in claim 1, wherein in step (a2), the array of carbon nanotubes is pressed along a direction perpendicular to the substrate.

6. The method as claimed in claim 1, wherein in step (a2), a process of cutting the carbon nanotube film is provided to form a predetermined size of a gas diffusion layer.

7. The method as claimed in claim 1, wherein step (b) comprises the substeps of:
   (b1) putting metal particles and carbon particles into a dispersion solution;
   (b2) adding water and a surface active agent to the dispersion solution to obtain a catalyst slurry; and
   (b3) coating the catalyst slurry on the carbon nanotube film and drying the catalyst slurry, thereby forming the catalyst layer on the carbon nanotube film to obtain the electrode.

8. The method as claimed in claim 7, wherein in step (b1), the carbon particles are selected from the group consisting of graphite, carbon black, carbon fibers, and carbon nanotubes.

9. The membrane electrode assembly as claimed in claim 7, wherein in step (b1), wherein the metal particles are selected from the group consisting of platinum particles, gold particles, and ruthenium particles.

10. The method as claimed in claim 7, wherein in step (b3), the coating the catalyst slurry on the carbon nanotube film comprises a spraying method, an immersing method, or a screen printing method.

11. The method as claimed in claim 1, wherein in step (c), the two electrodes are attached on the two opposite surfaces of the proton exchange membrane via a heat pressing process.

12. The method as claimed in claim 11, wherein the catalyst layer is configured for being sandwiched between the carbon nanotube film and the proton exchange membrane.

13. A method for making a membrane electrode assembly, the method comprising the steps of:
   (a1) providing an array of carbon nanotubes formed on a substrate, wherein the array of carbon nanotubes is a super-aligned array of carbon nanotubes obtained by follow steps:
      (a11) providing the substrate;
      (a12) forming a carbon nanotube growth catalyst layer on the substrate;
      (a13) annealing the substrate with the carbon nanotube growth catalyst layer in air at a temperature in a range from about 700° C. to about 900° C. for about 30 minutes to 90 minutes;
      (a14) heating the substrate with the carbon nanotube growth catalyst layer to a temperature in a range from about 500° C. to about 740° C. in a furnace with a protective gas therein; and
      (a15) supplying a carbon source gas to the furnace for about 5 minutes to 30 minutes and growing the super-aligned array of carbon nanotubes on the substrate, wherein the super-aligned array of carbon nanotubes has a height greater than 100 micometers and compromises a plurality of carbon nanotubes parallel to each other and approximately perpendicular to the substrate;
   (a2) providing a pressing device to press the array of carbon nanotubes, thereby forming a carbon nanotube film;
   (b) forming a catalyst layer on the carbon nanotube film to obtain a first electrode, and repeating steps (a1)-(b) to obtain a second electrode; and
   (c) providing a proton exchange membrane, and disposing the first electrode and the second electrode seperately on two opposite surfaces of the proton exchange membrane, thereby forming the membrane electrode assembly.

14. The method as claimed in claim 13, wherein the plurality of carbon nanotubes in the super-aligned array of carbon nanotubes is closely packed together by the van der Waals attractive force.

15. The method as claimed in claim 13, wherein in step (a2), the array of carbon nanotubes is pressed along a direction perpendicular to the substrate.

16. The method as claimed in claim 13, wherein the carbon nanotube film comprising a plurality of carbon nanotubes aligned along a fixed direction parallel to the surface of the carbon nanotube film.

17. The method as claimed in claim 13, wherein step (b) comprises the substeps of:
   (b1) putting metal particles and carbon particles into a dispersion solution;
   (b2) adding water and a surface active agent to the dispersion solution to obtain a catalyst slurry; and (b3) coating the catalyst slurry on the carbon nanotube film and drying the catalyst slurry, thereby forming the catalyst layer on the carbon nanotube film to obtain the electrode.

18. The method as claimed in claim 17, wherein in step (b1), the carbon particles are selected from the group consisting of graphite, carbon black, carbon fibers, and carbon nanotubes.

19. The method as claimed in claim 17, wherein in step (b1), wherein the metal particles are selected from the group consisting of platinum particles, gold particles, and ruthenium particles.

* * * * *